Jan. 15, 1957 A. KÜRZEDER 2,777,698

MAGNETIC RECORDERS

Filed April 1, 1953

10 may be connected to any vibrating element. 4 is resiliently supported by leaf spring INVENTOR:
ALFONS KÜRZEDER
BY:
[signature]
agt United States Patent Office 2,777,698

Patented Jan. 15, 1957

2,777,698

MAGNETIC RECORDERS

Alfons Kürzeder, Nordlingen, Germany

Application April 1, 1953, Serial No. 346,102

7 Claims. (Cl. 274—4)

The present invention relates to magnetic recorders and in particular to a magnetic recorder having a swinging element directly connected to an acoustical element such as a diaphragm of a microphone, so that when the diaphragm is vibrating, the swinging element will record a signal on a record carrier in accordance with the signal vibrations. It is an object of the present invention to provide a recording device having no electrical connections.

Another object is to provide a magnetic recorder which is portable.

A further object is to provide a magnetic recorder requiring no amplification of the input.

One of the embodiments of the present invention comprises, in combination, means for moving the record carrier along a predetermined path, a magnet body having a south pole end and a north pole end, two pole portions on one of the pole ends on the magnetic body arranged adjacent to the path of the record carrier spaced from each other in direction of the path so as to form a gap between themselves, one pole portion on the other of the pole ends of the magnetic body arranged adjacent the gap, means for mounting at least one of the pole portions on the magnet body movable relative to the same in direction of the path of the record carrier, and means for oscillating the thus movably mounted pole end portion in accordance with the oscillations to be recorded.

Another embodiment of the present invention comprises, in combination, means for moving the record carrier along a predetermined path, a magnet body having a south pole end and a north pole end, a pair of substantially U-shaped members each of the pair having a free end, the members extending from one of the pole ends of the magnet body and arranged with the free ends adjacent to the path of the record carrier and spaced from each other in direction of the path so as to form a gap between themselves, an armature reed, means for mounting the armature reed at the other of the pole ends in movable relation to the same in direction of the path of the record carrier, the armature reed arranged adjacent the gap, and means for oscillating the movable armature reed in accordance with the oscillations to be recorded.

The novel features which are considered as characteristic of the invention are set forth in particular in the appended claims. The invention itself, however, both as to its construction and its method of operation, together with additional objects and advantages thereof, will best be understood from the following description of specific embodiments when read in connection with the accompanying drawings, in which:

Figure 1:
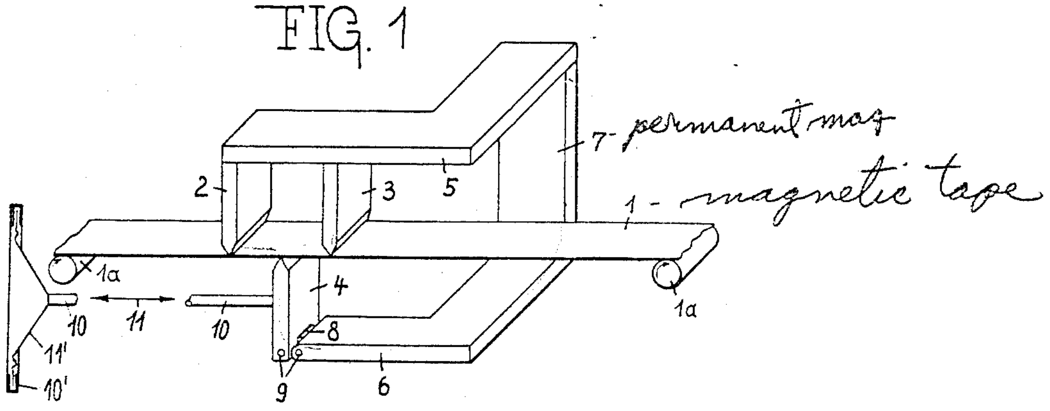
Fig. 1 is a perspective view of an embodiment of this invention.

Referring now to Fig. 1 there is shown a permanent magnet 7, to which there is connected at each end thereof a pair of members 5, 6 arranged opposite each other and having at their respective end portions, pole shoes 2, 3, and 4 respectively. As shown in Fig. 1 pole shoes 2 and 3 are arranged so that they are spaced from and parallel to each other. Pole shoe 4 is resiliently supported by a leaf spring (not shown) and pivotably connected to member 6 by means of hinge 8 and hinge rod 9. Members 5 and 6 are made of magnetizable material having a high permeability so that the magnetic lines of force from permanent magnet 7 will have a low reluctance path through members 5, 6. A complete magnetic loop exists as can be seen by tracing through from member 6 to pole shoe 4, through members 2 and 3, member 5, permanent magnet 7 and back to member 6. It will be noted that the magnetic lines of force are oppositely directed between pole shoes 2 and 4 and pole shoes 3 and 4. A magnetizable member in the form of tape or wire can be used for recording the desired signals. In Figure 1 a magnetizable tape 1 is shown between pole pieces 2, 3 and pole piece 4.

The tape 1 is wound about rollers 1*a* which may be made to turn by suitable means, so that the tape 1 moves, for example, from left to right. The rod 10 may be connected to any kind of diaphragm 11′, such as a diaphragm of a microphone, or a loud speaker 10′, so as to be influenced by the vibrations of the diaphragm 11′. The direction of the disturbances or vibrations is shown by arrow 11. One can connect the rod 10 to any vibrating, or swinging bodies, and not merely to a diaphragm for recording the vibrations of such bodies. The rod may for instance be connected to motors, steering mechanisms, lifting surfaces, or rocket casings. For purposes of describing the invention the vibrations of a diaphragm of a microphone is cited. However, any simple member, for instance a loud speaker member could be used. As shown in Fig. 1, rod 10 is also connected to the pole shoe 4 which operates as a swinging element between pole shoes 2 and 3, swinging or vibrating in rhythm to the vibrations of the diaphragm.

The magnetic recorder operates as follows:

With the moving of the record carrier 1 over the rollers 1*a* from left to right, the magnetic field between pole shoes 2 and 4 induces a signal into the tape or record carrier. With the pole shoe 4 in an undeflected position, i. e. not actuated by rod 10, the lines of force between pole shoes 2 and 4 will be equal to the lines of force existing between pole shoes 3 and 4. Also the lines of force between pole shoes 2 and 4 are in opposite direction to the lines of force between pole shoes 3, 4, hence, when the record carrier 1 is magnetized by the influence of the magnetic lines of force between the pole shoes 2 and 4, it will be demagnetized by the oppositely directed lines of force between pole shoes 3, 4. The arrangement of pole shoes 2, 3 in relation to each other and in relation to 4 is controlled to a great extent by the type of record carrier used, i. e. tape or wire, the important thing being that when the pole shoe or swinging element 4 is undeflected the record carrier will not be magnetized. When a signal is to be recorded it is impressed upon the diaphragm 11′ which causes the diaphragm 11′ to vibrate. With the vibration of the diaphragm 11′, the swinging element 4 will likewise begin to vibrate since it is connected to the diaphragm 11′ by means of rod 10. Assuming an initial displacement of the swinging element to the left, a stronger magnetic field will exist between pole shoe 2 and the swinging element 4 than between pole shoe 3 and the swinging element 4. As a result the record carrier will be magnetized to a greater degree between pole piece 2 and swinging element 4 than it had been when the swinging element 4 was undeflected. As the magnetized portion moves from the region between swinging element 4 and pole shoe 3, it will be demagnetized but this time to a lesser degree, since the flux lines between pole shoe 3 and the swinging element 4 are now less dense than they had been when the swinging element 4 had been in its undeflected position. As a result a net magnetic field will be impressed on the record carrier in the form of a signal which is directly related to the deflections of the swinging element 4 and the diaphragm 11'. When the swinging element 4 is displaced from its null position towards the left and then back through the null position towards the right, the record carrier 1 does not merely experience a change in the flux in the sense of amplitude modulation, when a constant uniform flux strength is merely changed, but such displacement from left to right also results in a reversal in direction of the magnetic flux.

Figure 2:
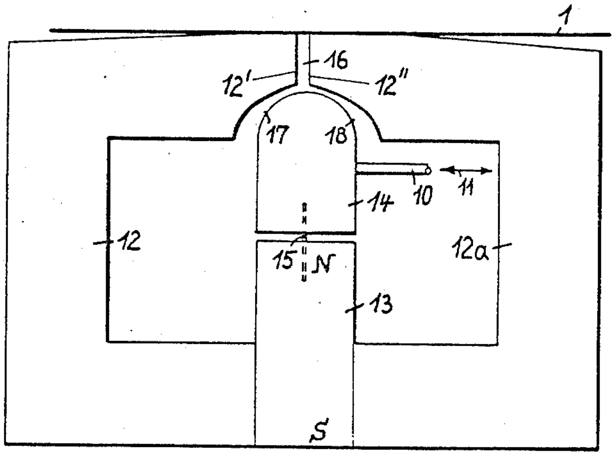
Fig. 2 is a front view of another embodiment of this invention.

A modification of the recorder shown in Fig. 1 is illustrated in Fig. 2. The drum and the microphone represented in Fig. 1 have not been included in Fig. 2 but it is to be understood that the tape 1 in Fig. 2 is moved by similar means shown in Fig. 1. Likewise the rod in Fig. 2 is connected to a diaphragm as shown in Fig. 1.

In Fig. 2, a permanent magnet 13 having a south pole end and a north pole end is shown connected to a pair of members 12 which extend in opposite directions from the south pole end of the permanent magnet 13. Members 12, 12*a* are formed as substantially U-shaped members each having pole pieces 12' and 12" respectively adjacent to the path of the record carrier 1 and spaced from each other in direction of the path of the record carrier so as to form a funnel shaped gap 16. Members 12, 12*a* are preferably made of a magnetizable material having a low reluctance to magnetic lines of force.

An armature reed 14 is movably supported at the north pole end of permanent magnet 13 by means of an armature spring 15. Armature reed 14 is adapted to move in the direction of the path of the record carrier, and arranged adjacent the gap 16 so as to form gaps 17, 18. The record carrier is moved by rollers in a similar fashion to that explained in reference to Fig. 1. For purposes of explaining the invention it will be assumed that the tape 1 moves from left to right and in communication with the gap 16 formed between pole piece elements 12' and 12".

The embodiment shown in Fig. 2 operates as follows:

When the reed 10 is undeflected, the magnetic field existing between pole piece 12' and armature reed 14 will be equal to the magnetic field existing between pole piece 12" and armature reed 14. Under these conditions there is a parallel magnetic circuit for the magnetic lines of force which may be seen to include, starting from the north pole of permanent magnet 13, armature reed 14, pole piece 12', member 12, the south pole end of the permanent magnet and back to the north pole. The other path, starting again from the north pole end of the permanent magnet 13, will be armature reed 14, pole piece 12", member 12*a*, the south pole end of the permanent magnet 13, and back to the north pole. Therefore, with armature reed 14 in an undeflected position, an equal number of lines of force will be present in each of the parallel magnetic circuits directed in opposite directions, resulting in a zero magnetizing force across gap 16. In this position of reed 14 no signal is impressed on record carrier. Assume now that the armature reed 14 is deflected by a signal to be recorded in such manner that it is deflected to the left. With such deflection more magnetic lines of force will be found across gap 17 than across gap 18. Due to the greater number of magnetic lines of force in one of the parallel magnetic circuits than the other a larger magnetic field will be found between pole piece 12' and armature reed 14, than between pole piece 12" and armature reed 14. The different magnetic field strengths across gap 17 and gap 18 produces a net magnetic force across gap 16 which gives rise to magnetic lines of force across gap 16 which in turn induces a signal into the record carrier 1. It is therefore apparent that the record carrier 1 will have a signal impressed upon it which is directly related to the deflections of the armature reed 14 from its neutral position.

It will be understood that each of the elements described above, or two or more together, may also find a useful application in other types of magnetic recorders differing from the type described above.

While the invention has been illustrated and described as embodied in magnetic recorders, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Arrangement for magnetically recording oscillations in a magnetizable record carrier comprising, in combination, means for moving the record carrier along a predetermined path; a magnet body having a south pole end and a north pole end; two pole portions on one of said pole ends on said magnetic body arranged adjacent to the path of said record carrier spaced from each other in direction of said path so as to form a gap between themselves; one pole portion on the other of said pole ends of said magnetic body arranged immediately adjacent said gap; means for mounting said one pole portion on said magnet body movable relative to the same in direction of the path of said record carrier; and means for oscillating the thus movably mounted pole end portion in accordance with the oscillations to be recorded.

2. Arrangement for magnetically recording oscillations in a magnetizable record carrier comprising, in combination, means for moving the record carrier along a predetermined path; a magnet body having a south pole end and a north pole end; two pole portions on one of said pole ends of said magnetic body arranged on one side of and adjacent to the path of said record carrier spaced from each other in direction of said path so as to form a gap between themselves; one pole portion on the other of said pole ends of said magnetic body arranged on the other side of the path of said record carrier immediately adjacent said gap and at substantially equal distance from said first mentioned two pole portions; means for mounting at least one of said pole portions on said magnet body movable relative to the same in direction of the path of said record carrier; and means for oscillating the thus movably mounted pole end portion in accordance with the oscillations to be recorded.

3. Arrangement for magnetically recording oscillations in a magnetizable record carrier comprising, in combination, a record carrier; a permanent magnet body having a south pole end and a north pole end; two pole portions on one of said pole ends on said magnetic body arranged adjacent to the path of said record carrier spaced from each other in direction of said path so as to form a gap between themselves; one pole portion on the other of said pole ends of said magnetic body arranged immediately adjacent said gap and perpendicular to the direction of motion of said record carrier; means for mounting at least said one pole portion on said magnet body movable relative to the same in direction of the path of said record carrier in such manner that said record carrier is adapted to move in contact with said two pole portions and said one pole portion of said magnet body; and means for oscillating the thus movably mounted pole end portion in accordance with the oscillations to be recorded.

4. Arrangement for magnetically recording oscillations in a magnetizable record carrier comprising, in combination, means for moving the record carrier along a predetermined path; a magnet body having a south pole end and a north pole end; two pole portions in substantial parallel alignment on one of said pole ends of said magnetic body arranged adjacent to the path of said record carrier spaced from each other in direction of said path so as to form a gap between themselves; one pole portion on the other of said pole ends of said magnetic body arranged immediately adjacent said gap; means for mounting said one pole portion on said magnet body movable relative to the same in direction of the path of said record carrier; and means for oscillating the thus movably mounted pole end portion in accordance with the oscillations to be recorded.

5. Arrangement for magnetically recording oscillations in a magnetizable record carrier comprising, in combination, means for moving the record carrier along a predetermined path; a magnet body having a south pole end and a north pole end; a pair of extensions consisting of magnetic material having a high permeability, one of said extensions extending from said north pole end and the other of said pair from the south pole end, each of said extensions extending in the same direction and each having free ends opposite each other; two pole portions on one of said extensions at said free end thereof arranged adjacent to the path of said record carrier, said pole portions spaced from each other so as to form a gap between themselves; one pole portion on the free end of said other of said pair of extensions arranged immediately adjacent said gap; means for mounting said one pole portion on said magnet body movable relative to the same in direction of the path of said record carrier; and means for oscillating the thus movably mounted pole end portion in accordance with the oscillations to be recorded.

6. Arrangement for magnetically recording oscillations in a magnetizable record carrier comprising, in combination, means for moving the record carrier along a predetermined path; a magnet body having a south pole end and a north pole end; a pair of substantially U-shaped members having a high magnetic permeability, each of said pair being connected at one end thereof to one of said pole ends of said magnet body, the other end thereof arranged adjacent to the path of said record carrier and spaced from each other in a direction of said path so as to form a gap between themselves; an armature reed; means for mounting said armature reed at the other of said pole ends in movable relation to the same in direction of the path of said record carrier, said armature reed being arranged immediately adjacent said gap; and means for oscillating the movable armature reed in accordance with the oscillations to be recorded.

7. Arrangement for magnetically recording oscillations in a magnetizable record carrier comprising, in combination, means for moving the record carrier along a predetermined path; a magnet body having a south pole end and a north pole end; a pair of substantially U-shaped members having a high magnetic permeability, each of said pair being connected at one end thereof to one of said pole ends of said magnet body, the other end thereof arranged adjacent to the path of said record carrier spaced from each other in direction of said path so as to form a funnel-shaped gap between themselves; an armature reed having an end adapted to extend into the mouth of said funnel-shaped gap; means for mounting said armature reed at its other end at the other of said pole ends in movable relation to the same in direction of the path of said record carrier, said armature reed being arranged immediately adjacent said gap; and means for oscillating the movable armature reed in accordance with the oscillations to be recorded.

References Cited in the file of this patent

UNITED STATES PATENTS

| | | |
|---|---|---|
| 901,397 | Stuart | Oct. 20, 1908 |
| 2,402,985 | Caughey et al. | July 2, 1946 |